(No Model.)
J. A. HADLEY.
COFFEE POT.
No. 423,867. Patented Mar. 18, 1890.
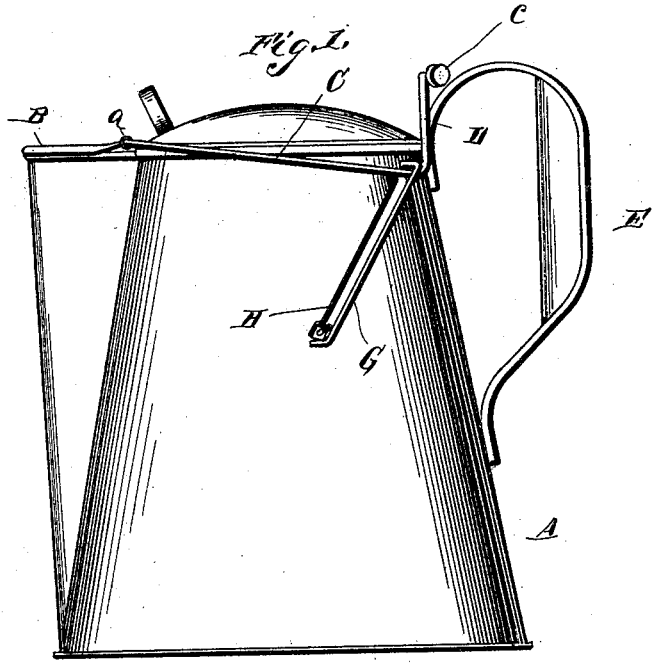
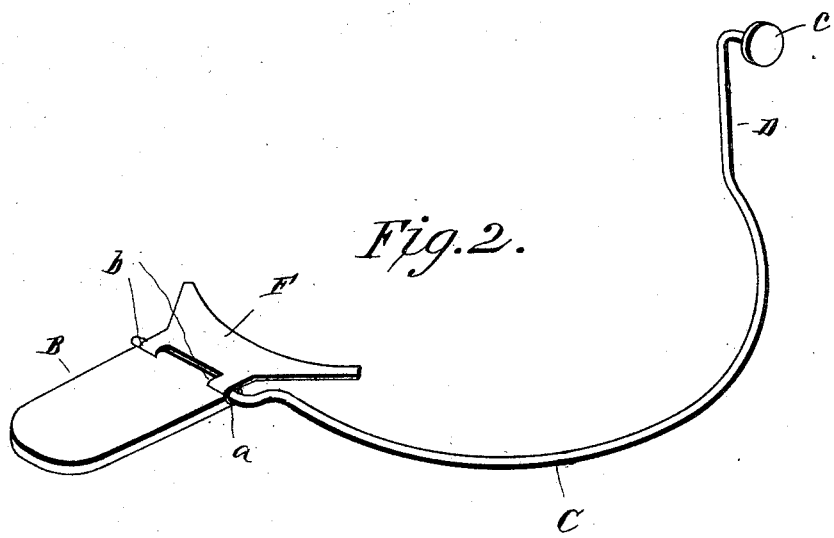
Witnesses
C. B. Taylor
Phil C. Masi
Inventor
J. A. Hadley,
By his Attorney
E. W. Anderson.

UNITED STATES PATENT OFFICE.

JOSHUA A. HADLEY, OF BRAZIL, INDIANA, ASSIGNOR TO JOHN D. SOURWINE AND ALLEN J. SOURWINE, OF SAME PLACE.

COFFEE-POT.

SPECIFICATION forming part of Letters Patent No. 423,867, dated March 18, 1890.

Application filed September 30, 1889. Serial No. 325,539. (No model.)

*To all whom it may concern:*

Be it known that I, JOSHUA A. HADLEY, a citizen of the United States, and a resident of Brazil, in the county of Clay and State of Indiana, have invented certain new and useful Improvements in Coffee-Pots; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a side view of the coffee-pot, showing the invention. Fig. 2 is a detail view in perspective.

This invention has relation to coffee-pot attachments; and it consists in the construction and novel combination of the parts as hereinafter described, and pointed out in the claims.

The object of the invention is to render the interior of the vessel impervious, in a measure, to outside influences, and at the same time to prevent the escape therefrom of the aroma or volatile properties of the contents evolved during the process of making the coffee.

In the accompanying drawings, the letter A indicates a coffee pot or vessel having a spout of the usual construction, the outlet of the latter being closed or unclosed at will by the operation of a cap or cover B, connected to a curved lever C, disposed around the vessel A near its rim, and terminating in a vertical thumb-piece or projection D at a right angle to said curved lever near the handle E.

The curved lever C has a forward arm $a$, extending at a right angle to the convexity of its arc, which is secured to the rear of the cap B. A hinge-connection is formed with said cap and the upper rear edge of the spout by an angular curved apron F, of sheet metal, which is cut away in the center of its forward edge to form end barrels $b$, through which the arm $a$ passes, the opposite rear edge $c$ of the said apron having a concave shape conforming to the convexity of the rim of the vessel at that point and being secured thereto, as shown. The curved lever extending from its arm-connection $a$ with the spout-cover B extends around the rim of the coffee pot or vessel to the rear, projecting through a keeper or guide G, secured obliquely to the outside of the vessel, extending downward from a point near the upper junction of the handle with the coffee-pot. A guard or fender H is also secured at the same angle with the keeper to the vessel to insure free movement against the side of the vessel. The vertical thumb piece or projection D may be horizontally extended and provided with a button or disk, as shown at $c$; but the essential feature at this point is the projection D, whereby the cap can be raised and lowered with the thumb of the same hand used in dispensing the contents of the vessel.

What I claim, and desire to secure by Letters Patent, is—

1. In a coffee-pot, the combination, with the spout and the hinged cover of the latter, of the curved lever rigidly secured to said cover and extending to the rear of the vessel near the handle to form an actuating-arm, the thumb-piece or upward projection of said lever, and the keeper, substantially as set forth.

2. In a spout-closing attachment for coffee-pots, the combination of the spout-cover B, rigidly secured to the arm $a$ of the curved lever C, with the hinge connecting apron F, the thumb-piece D, the keeper G, and the fender H, substantially as shown and described.

In testimony whereof I affix my signature in presence of two witnesses.

JOSHUA A. HADLEY.

Witnesses:
JAMES N. DILLEY,
J. N. SOURWINE.